United States Patent
Shalev et al.

(10) Patent No.: US 10,263,878 B2
(45) Date of Patent: Apr. 16, 2019

(54) PROTOCOL DETERMINATION

(71) Applicant: HEWLETT PACKARD ENTERPRISE DEVELOPMENT LP, Houston, TX (US)

(72) Inventors: Gabi Shalev, Yehud (IL); Oren Gavriel, Yehud (IL); Einat Vaintrob Zilber, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 190 days.

(21) Appl. No.: 15/116,426

(22) PCT Filed: Apr. 24, 2014

(86) PCT No.: PCT/US2014/035266
§ 371 (c)(1),
(2) Date: Aug. 3, 2016

(87) PCT Pub. No.: WO2015/163878
PCT Pub. Date: Oct. 29, 2015

(65) Prior Publication Data
US 2017/0012852 A1     Jan. 12, 2017

(51) Int. Cl.
| | |
|---|---|
| *H04L 12/26* | (2006.01) |
| *G06F 11/34* | (2006.01) |
| *H04L 29/06* | (2006.01) |
| *G06N 7/00* | (2006.01) |
| *H04L 29/08* | (2006.01) |
| *G06F 9/445* | (2018.01) |

(52) U.S. Cl.
CPC .......... *H04L 43/18* (2013.01); *G06F 9/44536* (2013.01); *G06F 11/3409* (2013.01); *G06N 7/005* (2013.01); *H04L 67/02* (2013.01); *H04L 67/42* (2013.01)

(58) Field of Classification Search
CPC ......... H04L 43/08; H04L 43/18; H04L 43/50; H04L 67/22; G06F 11/3414–11/3688
See application file for complete search history.

(56) References Cited

U.S. PATENT DOCUMENTS 5,838,919 A  * 11/1998  Schwaller ............... H04L 43/50
                                                          709/224
7,100,092 B2   8/2006  Allred et al.
7,133,805 B1  11/2006  Dankenbring et al.
(Continued)

OTHER PUBLICATIONS

International Search Report & Written Opinion received in PCT Application No. PCT/US2014/035266, dated Dec. 30, 2014, 9 pages.
(Continued)

*Primary Examiner* — Wing F Chan
*Assistant Examiner* — Rajeshwari Krishnan

(57) ABSTRACT

In one implementation, a system for protocol determination includes a monitor engine to collect data relating to interactions with an application. In addition, the system includes a data engine to store loaded scripts to the application and corresponding interactions relating to the loaded scripts. In addition, the system includes a prediction engine to assign a value to each feature of the stored loaded scripts for the application, wherein the value is based on the usage of the application. In addition, the system includes a protocol engine to select a protocol based on the value.

13 Claims, 4 Drawing Sheets

(56) References Cited

U.S. PATENT DOCUMENTS

| | | | |
|---|---|---|---|
| 7,975,059 | B2 | 7/2011 | Wang et al. |
| 9,122,789 | B1 * | 9/2015 | Massa ................. G06F 11/3612 |
| 9,769,030 | B1 * | 9/2017 | Ramalingam ........... H04L 67/22 |
| 2009/0055522 | A1 | 2/2009 | Shen et al. |
| 2010/0180023 | A1 * | 7/2010 | Kraus .................... H04L 43/08 709/224 |
| 2010/0333072 | A1 | 12/2010 | Dulip et al. |
| 2011/0022899 | A1 | 1/2011 | Greenberg et al. |
| 2011/0082824 | A1 | 4/2011 | Allison et al. |
| 2011/0145795 | A1 | 6/2011 | Khanapurkar et al. |

OTHER PUBLICATIONS

Oracle, "3 Testing Application Load and Performance," (Web Page), Oracle Enterprise Manager Cloud Control Getting Started with Oracle Fusion, Middleware Management Plug-in, Release 12.1.0.5, copyright 2011, 20 pages, available at http://docs.oracle.com/cd/E24628_01/install.121/e24215/appreplay.htm.

Testing Guru, "Performance Testing—Protocol Selection, Script Recording," (Web Page), Sep. 10, 2013, 2 pages, available at http://softsmith-testing.blogspot.in/2013/09/performance-testing-protocol-selection.html.

\* cited by examiner

PROTOCOL DETERMINATION

BACKGROUND

Load testing of applications that facilitate client-server interaction can require that multiple instances of the applications be executed simultaneously, or near-simultaneously, and that certain performance metrics be measured and the resulting measurements collected, processed, and analyzed. Executing a sufficient number of instances of the application to correctly simulate an actual use-case may be difficult. Moreover, the quality of the test results may depend on the protocols chosen by a test engineer when executing the application load test.

DETAILED DESCRIPTION

Figure 1:
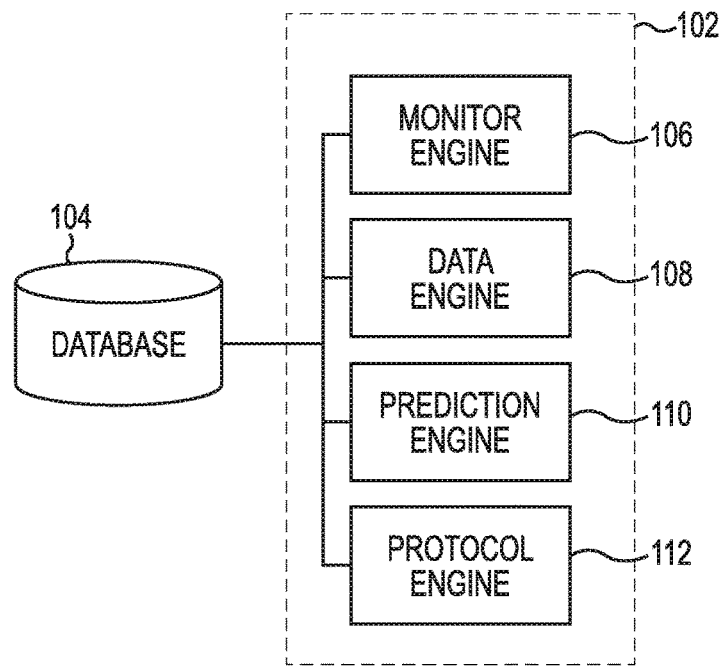
FIG. 1 illustrates a diagram of an example of a system for protocol determination according to the present disclosure.

A number of load testing tools (e.g., LoadRunner, Visual Studio, Open STA, etc.) can be utilized to simulate end user interactions with a computer application (e.g., software and/or hardware application, etc.). That is, a load testing tool can be utilized to simulate how an application will perform when running (e.g., operating) with a plurality of end users are utilizing the application before real end users are allowed to utilize the application. The load testing tools can be beneficial for testers of applications to ensure that an application will perform properly when a plurality of real users utilize the application.

The load testing tools can have the capability to utilize and/or select from a number of different communication protocols (e.g., rules for message and data exchange in a network, etc.). In addition, an application can utilize different communication protocols for different features (e.g., functions, tasks, actions, and/or functions performed by the execution of the application, etc.) of the application. In some embodiments, determining the correct protocol for a particular application can be difficult. For example, a new application can include a plurality of features with little or no available materials (e.g., information, references, etc.) that disclose properties (e.g., internal properties, software, hardware, protocols, etc.) of the features and/or application. In this example, it can be difficult to determine which protocols to utilize when performing a load test utilizing a load testing tool.

Embodiments of the present disclosure can collect data that relates to monitored interactions with an application. The data that is collected can be analyzed to determine a protocol that will be compatible with the application. For example, the data can be collected and analyzed using a machine learning method (e.g., k-nearest neighbors (KNN), etc.) to select a protocol that corresponds to the collected data from the monitored application.

In some embodiments, the machine learning method can include utilizing the data that is collected from the monitored application to categorize a number of features of the data. In these embodiments, a protocol can be determined based on a comparison of the outcomes from categorizing the number of features of the data. Utilizing the machine learning method enables the utilization of more of the data that is collected from the monitored application compared to previous methods. That is, the machine learning method enables comparison and/or utilization of multiple features of the data instead of utilizing a single feature, such as particular modules being loaded and/or executed by the application, to determine a corresponding protocol. As utilized further herein, a module includes instructions that when executed by a processing resource performs a particular function.

The protocol determination described herein can be highly adaptable to predict a communication protocol for various applications based on monitored properties of the various applications. The protocol determination described herein can utilize monitored interactions with the various applications and utilize a plurality of features from the monitored interactions to determine and suggest a protocol that can be utilized with a corresponding application.

Figure 2:
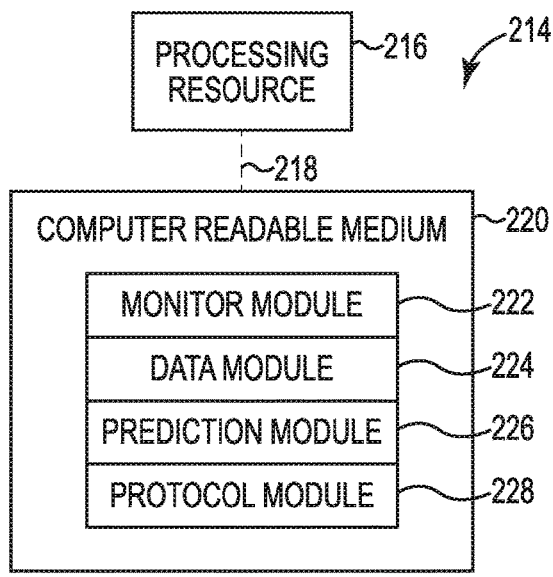
FIG. 2 illustrates a diagram of an example computing device according to the present disclosure.

FIGS. 1 and 2 illustrate examples of system 100 and computing device 214 according to the present disclosure. FIG. 1 illustrates a diagram of an example of a system 100 for protocol determination according to the present disclosure. The system 100 can include a database 104, protocol determination system 102, and/or a number of engines (e.g., monitor engine 106, data engine 108, prediction engine 110, protocol engine 112). The protocol determination system 102 can be in communication with the database 104 via a communication link, and can include the number of engines (e.g., monitor engine 106, data engine 108, prediction engine 110, protocol engine 112, etc.). The protocol determination system 102 can include additional or fewer engines that are illustrated to perform the various functions described herein.

The number of engines (e.g., monitor engine 106, data engine 108, prediction engine 110, protocol engine 112) can include a combination of hardware and programming that is configured to perform a number of functions described herein (e.g., collect data relating interactions with an application, store loaded scripts to the application and corresponding interactions relating to the loaded scripts, assign a value to each feature of the stored loaded scripts for the application, wherein the value is based on the usage of the application, select a protocol based on the value, etc.). The programming can include program instructions (e.g., software, firmware, etc.) stored in a memory resource (e.g., computer readable medium, machine readable medium, etc.) as well as hard-wired program (e.g., logic).

The monitor engine 106 can include hardware and/or a combination of hardware and programming to collect data relating to interactions with an application. The monitor engine 106 can include hardware and/or a combination of hardware and programming to monitor a number of features of the application. For example, the data relating to the interactions with the application can include, but is not limited to: network traffic, buffers being sent or received (e.g., HTTP, FTP, IMAP, POP3, etc.), URLs, specific content type, protocol utilized by tester and/or end user, tester and/or end user feedback, among other data relating to interactions with the application.

The data engine 108 can include hardware and/or a combination of hardware and programming to store loaded scripts to the application and corresponding interactions relating to the loaded scripts. The data engine 108 can include hardware and/or a combination of hardware and programming to store scripts that have been loaded to the application in a centralized database (e.g., database 104, etc.). The loaded scripts can include scripts that were loaded by a tester of the application. That is, the loaded scripts can include scripts by an end user with information relating to the application. The loaded scripts can be scripts that include a single protocol or a plurality of protocols that have been successfully loaded by the application.

The prediction engine 110 can include hardware and/or a combination of hardware and programming to assign a value to each feature of the stored loaded scripts for the application, wherein the value is based on the usage of the application (e.g., usage by a tester, usage by an end user, etc.). The prediction engine 110 can include hardware and/or a combination of hardware and programming to translate the received data into the number of features and save the number of features into a table. Each of the number of features can be assigned a value based on a rating of importance (e.g., how likely the feature can be used to predict a protocol, how often the feature corresponds to a protocol, etc.). In addition, in some embodiments, each feature can be categorized and/or classified as a particular type. When each feature is categorized, a protocol that corresponds to a greater ability to correctly categorize examples can be selected by the protocol engine 112.

The protocol engine 112 can include hardware and/or a combination of hardware and programming to select a protocol based on the value. The protocol engine 112 can select the protocol based on the assigned value from the prediction engine 110.

FIG. 2 illustrates a diagram of an example computing device 214 according to the present disclosure. The computing device 214 can utilize software, hardware, firmware, and/or logic to perform a number of functions described herein.

The computing device 214 can include a combination of hardware and program instructions configured to share and/or exchange information. The hardware, for example, can include a processing resource 216 and/or a memory resource 220 (e.g., computer-readable medium (CRM), machine readable medium (MRM), database, etc.). A processing resource 216, as used herein, can include one or more processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., monitor interactions of an application to collect data corresponding to a number of protocols, wherein the interactions includes a number of modules being loaded on the application, network traffic protocols, and a number of scripts loaded on the application, classify (e.g., categorize) the interactions of the application for each of a number of features corresponding to the number of protocols, calculate a numeric gain for each of the number of features by comparing the classified interactions of the application for each of the number of features, select a protocol that includes particular features from the number of features based on the numeric gain of the particular features, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., monitor module 222, data module 224, prediction module 226, protocol module 228) can include CRI that when executed by the processing resource 216 can perform a number of functions. The number of modules (e.g., monitor module 222, data module 224, prediction module 226, protocol module 228) can be sub-modules of other modules. For example, the data module 224 and the prediction module 226 can be sub-modules and/or contained within the same computing device. In another example, the number of modules (e.g., monitor module 222, data module 224, prediction module 226, protocol module 228) can comprise individual modules at separate and distinct locations (e.g., CRM, etc.).

Each of the number of modules (e.g., monitor module 222, data module 224, prediction module 226, protocol module 228) can include instructions that when executed by the processing resource 216 can function as a corresponding engine as described herein. For example, the monitor module 222 can include instructions that when executed by the processing resource 216 can function as the monitor engine 106. In another example, the protocol module 228 can include instructions that when executed by the processing resource 216 can function as the protocol engine 112. In another example, the data module 224 can include instructions that when executed by the processing resource 216 can function as the data engine 108. Furthermore, in another example, the prediction module 226 can include instructions that when executed by the processing resource 216 can function as the prediction engine 110.

Figure 3:
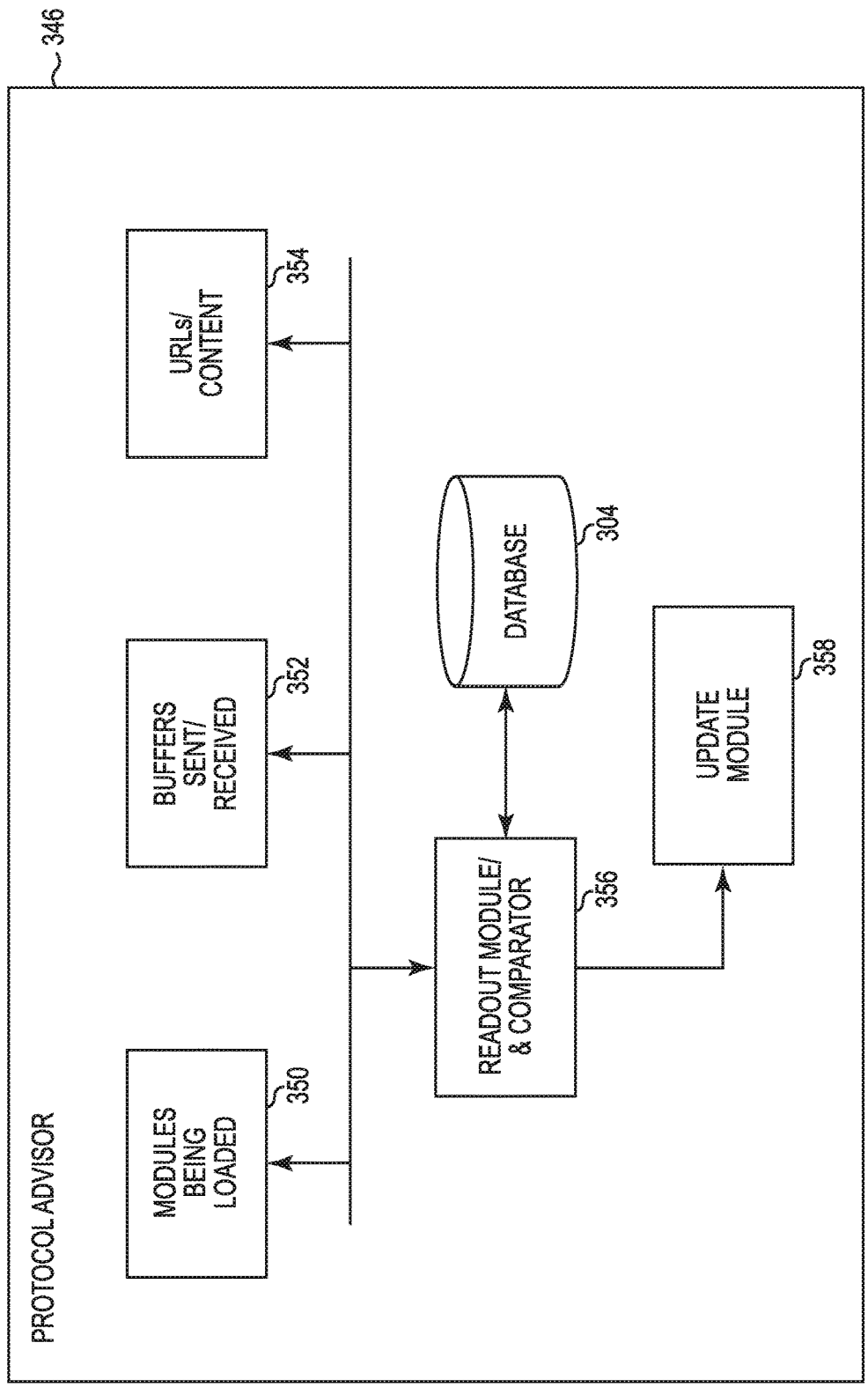
FIG. 3 illustrates a diagram of an example protocol advisor according to the present disclosure.

FIG. 3 illustrates a diagram of an example protocol advisor 346 according to the present disclosure. The protocol advisor 346 can include hardware and/or a combination of hardware and/or a combination of hardware and programming to perform the functions described herein (e.g., collect data relating interactions with an application, store loaded scripts to the application and corresponding interactions relating to the loaded scripts, assign a value to each feature of the stored loaded scripts for the application, wherein the value is based on the usage of the application, select a protocol based on the value, etc.). The protocol advisor 346 can utilize a number of engines and/or modules as described in reference to FIG. 1 and FIG. 2.

The protocol advisor 346 can utilize a number of monitors for reading and recording information and communications between a number of devices, such as between a user machine (e.g., client machine) and a server (e.g., computing device, etc.). The user machine can be a coupled (e.g., communicatively coupled) to a network such as a local area network (LAN), wide area network (WAN), and/or Internet. The server can be an Internet-based server. The monitors for reading, recording information, and/or communication relating to the application can be utilized to determine a number of features that can include, but are not limited to: modules being loaded, network traffic, and/or Web fine tuning.

The protocol advisor 346 can include a module reader 350 to monitor modules being loaded, a buffer reader 352 to monitor buffers being sent and/or received, and a Web traffic reader 354 to monitor URLs and/or other content related to Web traffic. The readers and/or monitors 350, 352, 354 can provide data and/or information to comparator module 356. The comparator module 356 can compare the data to a number of rules stored in a database 304 and can select one or more protocols appropriate for the application to be load tested. The selected protocols may be displayed to a human user (load tester) by way of a user interface 460, shown in FIG. 4.

In FIG. 3, the module reader 350 can read and record the modules being loaded by the application. In some embodiments, modules can be known to require certain protocols when they are loaded by the application. For example, modules that correspond to a particular protocol can include: SAPGui—the application is saplogone.exe; database protocols use models such as odbc32.dll and db2cli.dll; and Seibel application has several ActiveX objects that are loaded into a browser but have the same unique prefix.

The buffer reader 352 can read network traffic to identify, where possible, signatures of buffers being sent and received. In some embodiments, certain network traffic protocols can have distinct buffer signatures. For example, some network traffic protocols with distinct buffers can include, but are not limited to: HTTP, FTP, IMAP, POP3, SMTP, and RDP.

The web traffic reader 354 can read and record HTTP traffic data, including HTTP-based traffic, such as URLs and specific content type. For example, the web traffic reader 354 can read and record traffic that can include, but is not limited to: SAP. Sap high level (aka SAP Click & Script), PeopleSoft, Oracle, and Flex. LoadRunner also offers general Web protocols on a basic level, as well as on a high level for browsers (aka Ajax Click & Script).

The information gathered by components of the protocol advisor 346 can be analyzed by the comparator 356 to determine and select a protocol for the application. The comparator 356 can include the engines and/or modules discussed in reference to FIG. 1 and FIG. 2. The comparator 356 can separate the data received from the module reader 350, buffer reader 352, and/or web traffic reader 354 into a number of features. The number of features can be separated in a number of ways. In some embodiments, the features are separated based on which reader and/or monitor the information was received from. For example, the information received from the web traffic reader 354 can be separated from information received from the module reader 350. In addition, or alternatively, the features can be separated further. That is, the information received from the web traffic reader 354 can be further separated into additional features that can include, but are not limited to: URLs, content, among other features of the information received from the web traffic reader 354.

Each of the number of features can be assigned a value (e.g., numeric gain, etc.). The value can represent an importance level for determining a protocol to utilize in a particular scenario utilizing the application. In some embodiments, the value can be assigned utilizing a machine learning method (e.g., k-nearest neighbors (KNN), etc.). In some embodiments, the KNN method is utilized to determine the importance level and/or numeric gain for each feature of the received data. For example, a feature can be assigned a value based on an entropy method (e.g., method to determine a quantity of activity for a corresponding feature). That is, the feature can be assigned a value based on a frequency (e.g., quantity of utilization over a period of time, etc.) that the feature is utilized in the data that is received from the module reader 350, the buffer reader 352, and/or web traffic reader 354.

The frequency of the feature can indicate a likelihood that the feature will be utilized for future communication sessions. That is, a number of features with the relatively highest value (e.g., importance level, numeric gain, quantity of utilization over a period of time, etc.) can be utilized to predict a protocol to be utilized when load testing the application. A protocol can correspond to particular features and the protocol can be predicted by utilizing the number of features with the relatively highest value.

In one particular example, the value can be calculated using an entropy method. For example, a feature A can include two possible values (e.g., YES value, NO value, etc.) and a feature B can include two possible values similar or the same to the two possible values for feature A. If, in this example, there can be a number of data examples that are received from the readers and/or monitors of the application for each of the two possible values. For example, there can be 10 data examples with a value of YES and 10 data examples with a value of NO that are received from the readers and/or monitors. In this example, the 10 data examples with the value of YES can be categorized to determine an efficiency of categorization.

The efficiency of categorization for data examples can correspond to a likelihood that the feature is likely to be a feature of the protocol that is utilized by the application. In one example, the 10 data examples for both feature A and feature B with a value of YES can be categorized into a first category (e.g., category X) and a second category (e.g., category Y). In this example, in regards to feature A, 5 of the data examples can be placed into the first category and 5 of the data examples can be placed into the second category. Additionally, in regards to feature B, 9 of the data examples can be placed into a first category and 1 of the data examples can be placed into a second category. In some embodiments, the first category and the second category that correspond to feature A can be the same categories or different categories than the first category and the second category that correspond to feature B.

Each of the number of features can have the success of the categorization compared to assign the value (e.g., numeric gain, etc.) based on the success of the categorization. For example, since feature B has a greater success of categorization (e.g., a greater number of data examples are categorized into a single category, categorized more accurately, etc.) when compared to feature A. That is, feature B included a categorization ratio of 9:1 and feature A included a categorization ratio of 5:5. In this example, feature B can be assigned a greater value than feature A since the categorization ratio of feature B is greater.

Feature B, in the previous example, can have a greater value than feature A. In addition, feature B can be compared to a plurality of other features utilizing the value assigned utilizing the same and/or similar categorization technique as described herein, Feature B, in this example, can have a relatively higher value compared to the plurality of other features. Thus, feature B can be determined to have the highest relative value. In this example, feature B can be utilized to determine a protocol that can be utilized to generate a script that can be utilized to test the application. When each of the number of features are assigned a value, a majority voting technique can be utilized to select a particular protocol based on the features with a relatively high value. The majority voting technique can include determining a number of examples that are determined to have the greatest assigned values. The number of examples that are determined to have the greatest assigned value can also be considered the number of examples that are most similar to features of the corresponding application based on the received data relating to the application.

The number of examples that are determined to have the greatest assigned value can be determined to be the K number of values. The K number of values can be a predetermined number of values that have the greatest assigned value and/or are the most similar features to the features of the application. The K number values can be used to determine and/or select a protocol to be used for the application.

By utilizing a machine learning method such as the KNN method to determine a number features that likely correspond to a protocol that can be utilized to generate a script that can be loaded into a load generator (e.g., LoadRunner, etc.) to determine how an application will respond under a load. In addition new protocol types can be easily added to the protocol determination as described herein. A new protocol can be added and stored in the central database (e.g., database 104 as referenced in FIG. 1) with corresponding features of applications that utilize the new protocol. This can be advantageous over previous methods since the attributes of the other protocols within the database do not need to be changed or altered to accommodate the new protocol. For example, even if a number of features of the new protocol are the same and/or similar to features of existing protocols, the protocol determination as described herein can distinguish between the new protocol and existing protocols without having to add additional information to the corresponding existing protocols.

Figure 4:
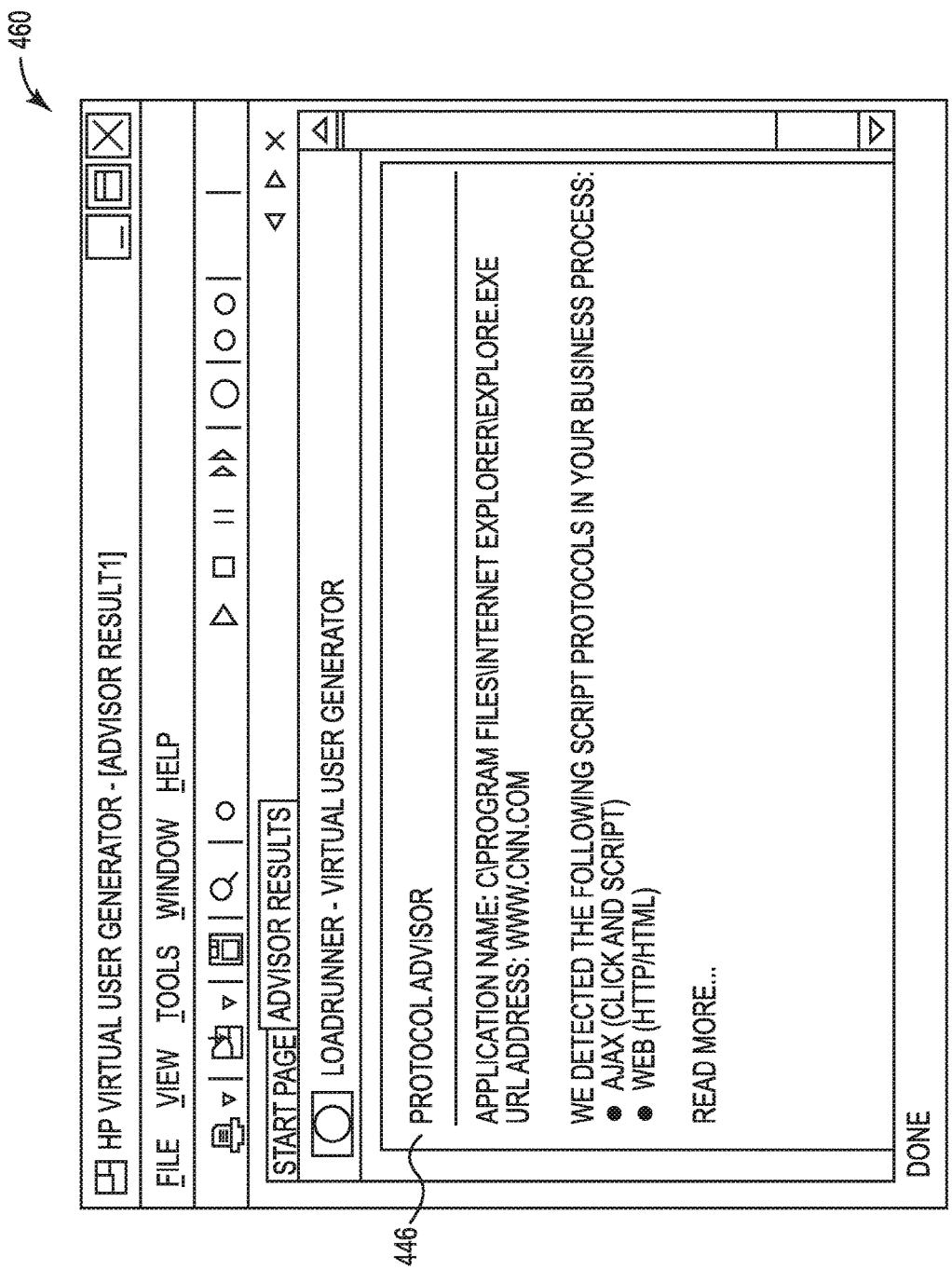
FIG. 4 illustrates a user interface according to the present disclosure.

FIG. 4 illustrates a user interface 460 according to the present disclosure. As described herein, a protocol can be selected utilizing a machine learning method for a plurality of features and the plurality of features that include a greater value can be utilized to select a protocol that utilizes the plurality of features. The user interface 460 can be utilized to display the protocol that is selected utilizing the machine learning method.

The user interface 460 can include a protocol advisor 446 that can display information relating to the particular application (e.g., application name, URL address, etc.). In addition, the protocol advisor 446 can display a number of protocols that are likely to be used by the application. As described herein, a plurality of features can be used to determine a protocol that is suitable for a particular application. Utilizing a plurality of features can ensure that a compatible protocol is selected and presented to the user.

Figure 5:
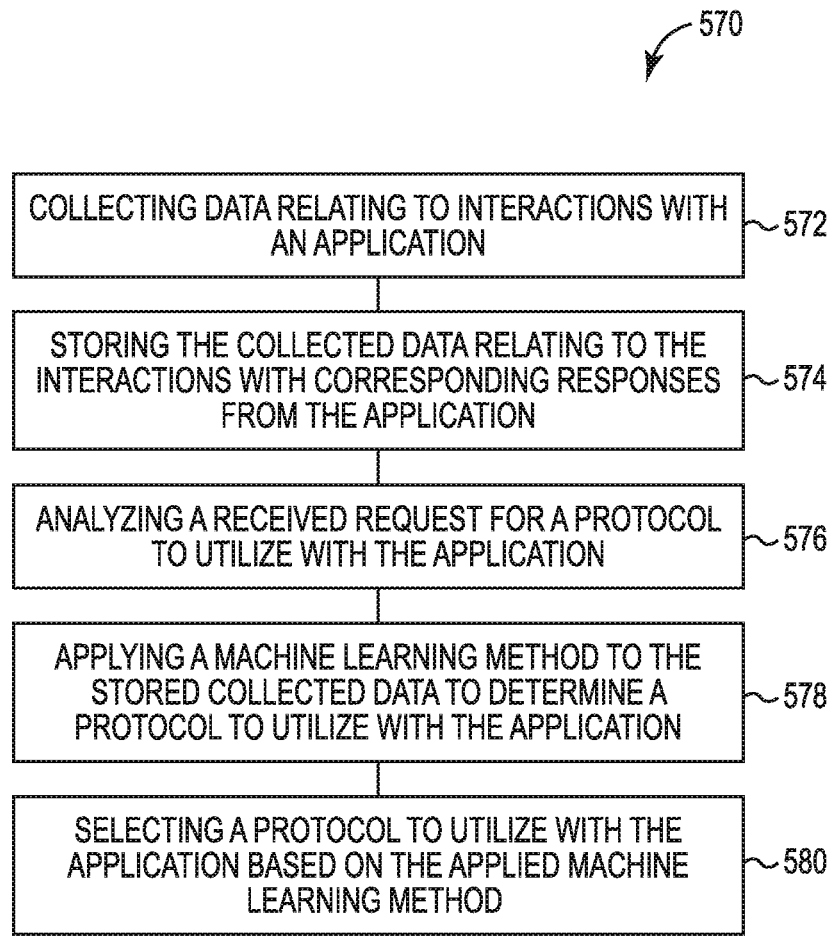
FIG. 5 is a flow chart of an example of a method for protocol determination according to the present disclosure.

FIG. 5 is a flow chart of an example of a method 570 for protocol determination according to the present disclosure. The method 570 for protocol determination can include a computer implemented method that utilizes a machine learning method (e.g., KNN, etc.) for utilizing a plurality of features that correspond to an application to determine and/or select a protocol that is compatible with the application. Previous methods can utilize a hardcoded or logic determination that can utilize "if then" statements to select a compatible protocol for the application. However, these previous methods can fail to analyze combinations of features, which can lead to incorrect selections.

At box 572 the method 570 can include collecting data relating to interactions with an application, wherein the data includes a number of features comprising modules loaded by the application, network traffic, URL information, and Web traffic. In some embodiments, the method 570 can include monitoring and/or collecting data relating to module combinations that are being loaded by the application. That is, a reader and/or monitor can collect data relating to modules that are being loaded by an application and combinations of modules can be monitored to give additional information on what type of protocol is being utilized by the application. In some embodiments, a greater value (e.g., gain value, etc.) can be assigned to features of a protocol that correspond to the combinations of modules that are monitored. In certain embodiments, the method 570 can include monitoring various combinations of the number of features.

At box 574 the method 570 can include storing the collected data relating to the interactions with corresponding responses from the application. The data that is collected from monitoring the application can be stored in a centralized database (e.g., database 104 as referenced in FIG. 1, datacenter, etc.). By storing the collected data relating to the application a machine learning method can be implemented on the data to determine a protocol that can be utilized in a script that can be loaded in a load generator to simulate a plurality of users on the application. Some embodiments include storing only scripts and/or corresponding features that have been successfully loaded utilizing a load generator. For example, scripts and/or features can be monitored. In this example, the scripts and/or features can be tested via a load generator to confirm that the scripts and/or features are compatible with the application.

At box 576 the method 570 can include analyzing a received request for a protocol to utilize with the application. Analyzing the received request for the protocol can include receiving a request from a user for a protocol advisor (e.g., protocol advisor 346 as referenced in FIG. 3, etc.). Analyzing the received request can include determining a corresponding application for the requested protocol. That is, the method 570 can include determining the application of a protocol request from a user.

At box 578 the method 570 can include applying a machine learning method to the stored collected data to determine a protocol to utilize with the application. As described herein, the machine learning method can include a machine learning method such as K-nearest neighbors machine learning method. The machine learning method can include separating the monitored data into a number of features and assigning a value to each of the number of features. Utilizing a K number of the features based on the assigned value, the K number of features can be utilized to determine and/or select a protocol based on the K number of features.

At box 580 the method 570 can include selecting a protocol to utilize with the application based on the applied machine learning method. As described further herein, the method 570 can include determining and/or selecting the protocol based on the machine learning method. That is, a number of features can be determined and each of the features can be assigned a value. The value assigned to each feature can be utilized to determine which features are most commonly utilized by the application and a protocol can be determined and/or selected based on which features are most commonly utilized by the application.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for protocol determination, comprising:
   a processor resource; and
   a memory resource on which is stored instructions that are to cause the processor resource to:
   load a script to execute interactions with an application;
   monitor interactions of the loaded script with the application, wherein interactions include features, and features include: modules loaded by the application, network traffic, and web traffic;
   store the monitored interactions of the loaded script with the application;
   assign a value to each feature of the loaded script based on a frequency of utilization of the respective feature,
   based on the assigned value of each feature, select a protocol to be utilized when performing a load test on the application utilizing a load testing tool.

2. The system of claim 1, wherein the instructions are further to cause the processor resource to:
   monitor module combinations from a number of modules being loaded by the application.

3. The system of claim 2, wherein the instructions are further to cause the processor resource to:
   assign a greater value to features that correspond to the module combinations.

4. The system of claim 1, wherein the instructions are further to cause the processor resource to:
   assign the value based on an outcome of the loaded script.

5. The system of claim 1, wherein the value includes a numeric gain for the respective feature.

6. The system of claim 5, wherein the numeric gain is based on a successful classification rate of each feature of the loaded script.

7. A non-transitory computer readable medium storing instructions that when executed by a processor resource, cause the processor resource to:
   load a script to execute interactions with an application;
   monitor interactions of the application with the loaded script to collect data corresponding to a number of protocols utilized by the application, wherein the interactions include modules loaded by the application, network traffic, and web traffic;
   classify the interactions of the application according to features associated with each of the protocols;
   calculate a numeric gain for each of the features by comparing the classified interactions of the application for each of the features, wherein the numeric gain is based on a frequency of utilization of the respective feature; and
   based on the numeric gain of the features, select a protocol to be utilized when performing a load test of the application utilizing a load testing tool.

8. The non-transitory computer readable medium of claim 7, wherein to monitor interactions of the application, the instructions are further to cause the processor resource to determine a number of executed combinations from the classified interactions of the application.

9. The non-transitory computer readable medium of claim 8, wherein to select the protocol, the instructions are further to cause the processor resource to compare the number of executed combinations to a number of stored combinations and corresponding protocols.

10. The non-transitory computer readable medium of claim 7, wherein to monitor interactions of the application, the instructions are further to cause the processor resource to compare monitored uniform resource locators (URLs) to determine if monitored URLs comprise a matching substring.

11. A method for protocol determination, comprising:
    loading, by a processor resource, a script to execute interactions with an application;
    monitoring, by the processor resource, interactions of the loaded script with the application,
    wherein the interactions include features, and the features include: modules loaded by the application, network traffic, URL information, and Web traffic;
    storing, by the processor resource, the monitored data relating to the interactions with corresponding responses from the application;
    analyzing, by the processor resource, a received request for a protocol to utilize with the application;
    applying, by the processor resource, a machine learning method to the stored data to assign a value to each of the features based on a frequency of utilization of the respective feature,
    determining based on the assigned values, by the processor resource, a protocol to be utilized for performing a load test on the application utilizing a load testing tool; and
    selecting, by the processor resource, the determined protocol to perform a load test on the application utilizing a load testing tool.

12. The method of claim 11, wherein the machine learning method is a k-nearest neighbors (KNN) learning method.

13. The method of claim 12, comprising receiving feedback from users interacting with the application and using the KNN learning method to incorporate the received feedback.

* * * * *